US009380086B2

(12) United States Patent
Baccichet et al.

(10) Patent No.: US 9,380,086 B2
(45) Date of Patent: Jun. 28, 2016

(54) PRE-TRANSCODING CONTENT ITEMS

(71) Applicant: Dropbox, Inc., San Francisco, CA (US)

(72) Inventors: Pierpaolo Baccichet, San Francisco, CA (US); Ziga Mahkovec, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 162 days.

(21) Appl. No.: 14/199,585

(22) Filed: Mar. 6, 2014

(65) Prior Publication Data

US 2015/0237102 A1 Aug. 20, 2015

Related U.S. Application Data

(60) Provisional application No. 61/941,402, filed on Feb. 18, 2014.

(51) Int. Cl.
*H04L 29/06* (2006.01)
(52) U.S. Cl.
CPC .......... *H04L 65/403* (2013.01); *H04L 65/4084* (2013.01); *H04L 65/602* (2013.01); *H04L 65/605* (2013.01); *H04L 67/42* (2013.01)
(58) Field of Classification Search
CPC ............................ H04L 65/607; H04L 65/403
USPC ...................... 726/2, 3, 5, 12; 455/438, 452.1
See application file for complete search history.

(56) References Cited

U.S. PATENT DOCUMENTS

| 7,181,538 B2 | 2/2007 | Tam et al. |
| 7,676,590 B2 | 3/2010 | Silverman et al. |
| 7,818,355 B2 | 10/2010 | Mills et al. |
| 8,312,079 B2 | 11/2012 | Newsome et al. |
| 8,458,746 B2 | 6/2013 | Chang et al. |

(Continued)

FOREIGN PATENT DOCUMENTS

| CN | 102223386 A | 10/2011 |
| EP | 2528347 A1 | 11/2012 |

(Continued)

OTHER PUBLICATIONS

"Multidimensional Transcoding for Adaptive Video Streaming"—Brandt et al, IBR, Aug. 2007 https://www.ibr.cs.tu-bs.de/papers/brandt-nossdav07.pdf.*
Zhang, D. et al., "Intermedia-Based Video Adaptation System: Design and Implementation," Tsinghua Science and Technology, Tsinghua University Press, Apr. 2012, pp. 113-127, vol. 17, No. 2.

*Primary Examiner* — Randy Scott
(74) *Attorney, Agent, or Firm* — Fenwick & West LLP

(57) ABSTRACT

A content management system pre-transcodes portions of content items provided for storage. When a content item is uploaded to the content management system for storage, the content management system stores the content item in an original format. The content management system transcodes a portion of the content item from the original format to a streaming format. The content management system stores the transcoded portion and makes the content item available for access. When a client device requests the content item from the content management system, the content management system first sends by streaming to the client device the stored transcoded portion in the streaming format. During the sending of the transcoded portion, the content management system transcodes a remainder of the content item that has not been transcoded to the streaming format. The content management system sends the transcoded remainder of the content item to the client device.

18 Claims, 6 Drawing Sheets

(56) References Cited

U.S. PATENT DOCUMENTS

| | | | |
|---|---|---|---|
| 9,037,674 B2* | 5/2015 | Hoffert | G06F 17/30905 709/217 |
| 2004/0199665 A1 | 10/2004 | Omar et al. | |
| 2005/0144165 A1* | 6/2005 | Hafizullah | H04L 29/06 |
| 2008/0195761 A1 | 8/2008 | Jabri et al. | |
| 2011/0196826 A1 | 8/2011 | Retief et al. | |

FOREIGN PATENT DOCUMENTS

| | | |
|---|---|---|
| WO | WO 03/091832 A2 | 11/2003 |
| WO | WO 2008/018851 A2 | 2/2008 |
| WO | WO 2013/164233 A1 | 11/2013 |

* cited by examiner

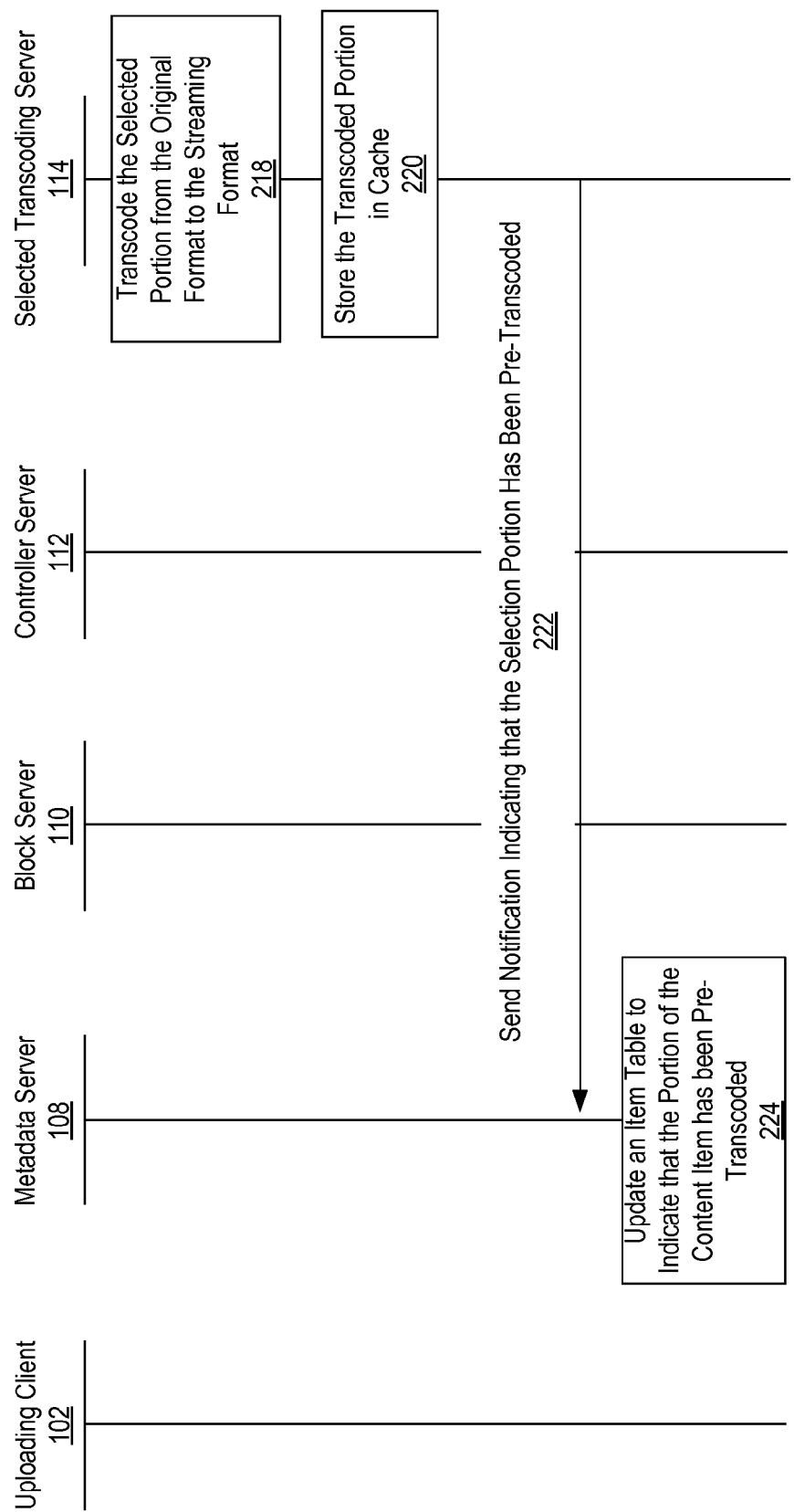

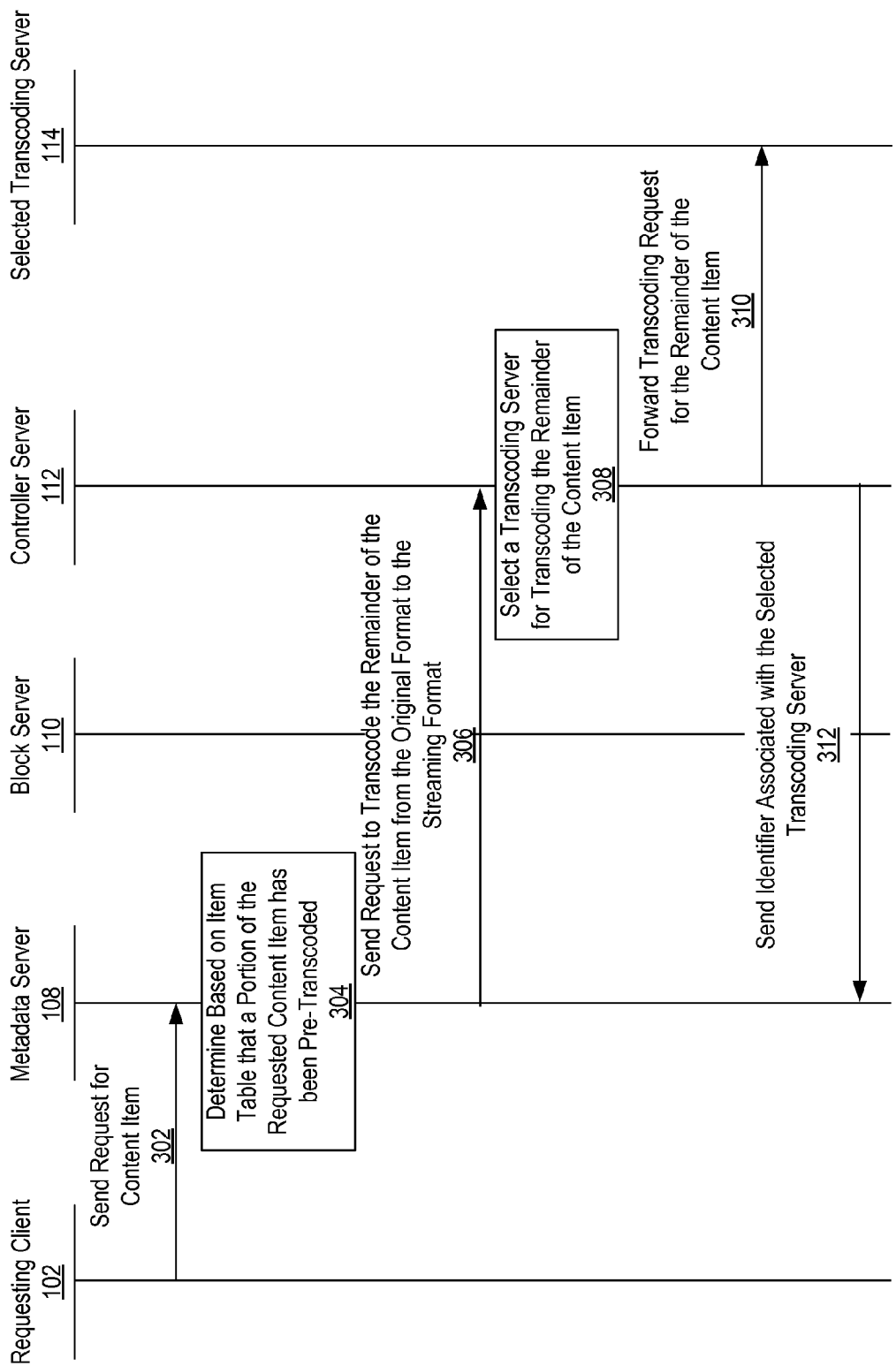

PRE-TRANSCODING CONTENT ITEMS

CROSS-REFERENCE TO RELATED APPLICATION

This application claims the benefit of provisional application 61/941,402, filed on Feb. 18, 2014, which is incorporated by reference herein in its entirety.

BACKGROUND

1. Field of the Embodiments

The embodiments pertain in general to content management systems, and more specifically to pre-transcoding portions of content items stored by a content management system.

2. Description of the Related Art

Content management systems enable users to access content items from multiple client devices. A user provides content items, such as videos to a content management system for storage. At any point, the user or another user with permission may request to access a stored content item from the content management system. When such a request is made for a content item that is adapted for streaming, the content management system typically streams the content item to the user's client device so that the client device can start playing the content item as it receives data segments of the content item. However, there is a delay between when the user requests the content item and when the content item starts playing on the user's client device. Some of the factors that contribute to the delay include processing performed by the content management system to be able to stream the content item and the amount of time it takes data segments to travel from the content management system to the user's client device. Waiting for the content item to start playing can cause the user to become frustrated and have an unsatisfactory experience.

BRIEF SUMMARY

A content management system pre-transcodes portions of content items provided for storage. When a content item (e.g., a video or audio file) is uploaded to the content management system for storage, the content management system stores the content item in an original format, which may be, for example, the original format in which the item is received. The content management system also transcodes a portion of the content item from the original format to a streaming format. The length of the transcoded portion is less than the total length of the content item. The content management system stores the transcoded portion and makes the content item available for access.

When a client device requests the content item from the content management system, the content management system first sends by streaming the stored transcoded portion in the streaming format to the client device. During the sending of the transcoded portion, the content management system transcodes a remainder of the content item that has not been transcoded to the streaming format. The content management system sends the transcoded remainder of the content item to the client device.

Features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 2A and 2B illustrate an interaction diagram of a process for pre-transcoding a portion of an uploaded content item according to one embodiment.

FIGS. 3A and 3B illustrate an interaction diagram of a process for streaming a stored content item to a client device according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
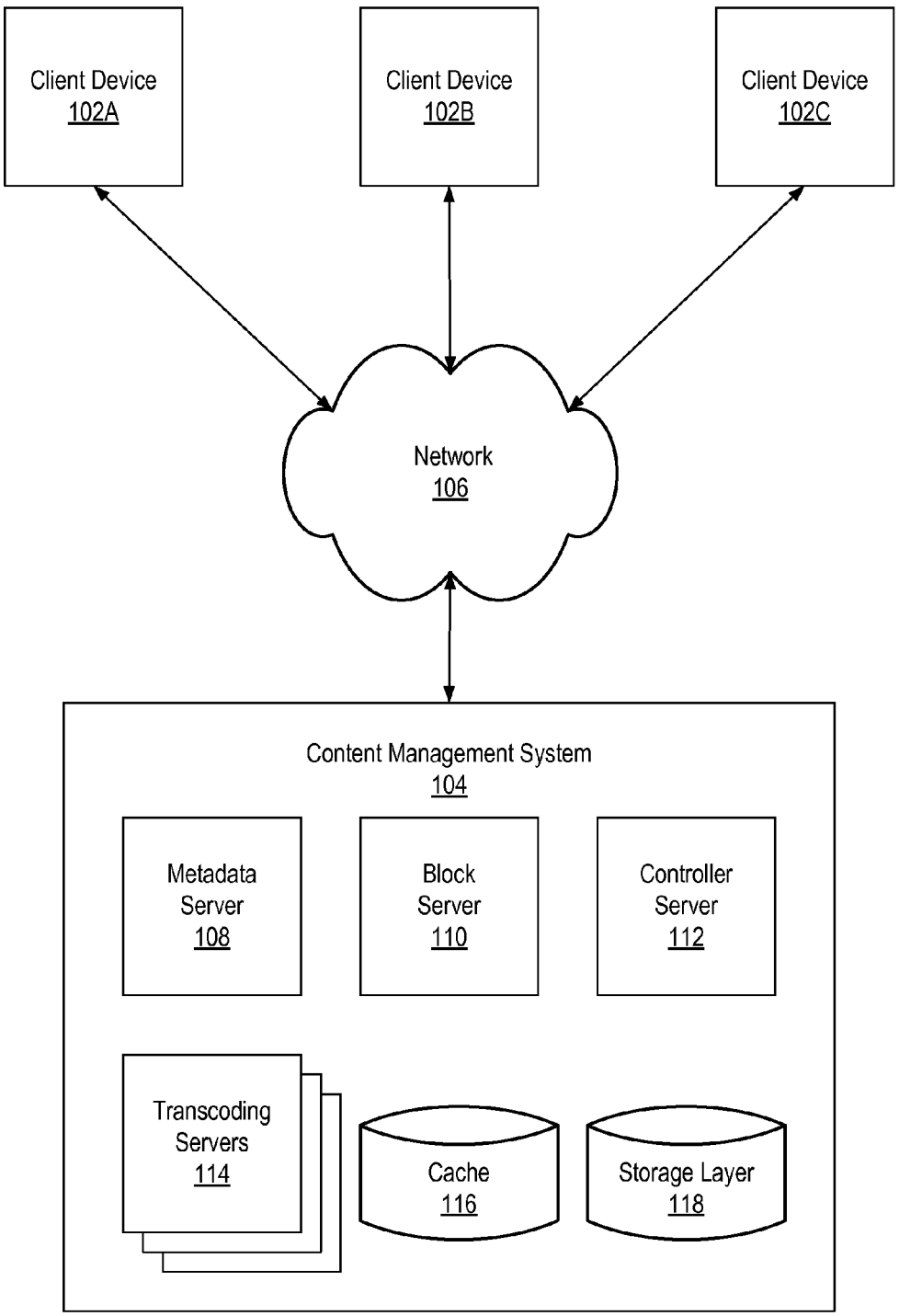
FIG. 1 is a block diagram of a content management system environment according to one embodiment.

FIG. 1 is a block diagram of content management system environment 100 according to one embodiment. Environment 100 includes client devices 102A, 102B, and 102C, and content management system 104 connected to network 106. Although illustrated environment 100 only includes three client devices 102, other embodiments include additional client devices 102 (e.g., thousands of client devices).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 106 enables communication among the entities connected to it. In one embodiment, network 106 is the Internet and uses standard communications technologies and/or protocols. Thus, network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, etc. Similarly, the networking protocols used on network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Each client device 102 is a computer system capable of communicating with content management system 104 via network 106. Client device 102 may be, for example, a personal computer, a mobile phone, a tablet, a personal digital assistant (PDA), or a television set-top box. Through client device 102 users of content management system 104 can send/upload content items to content management system 104 for storage. A content item includes digital data, audio, video, images, documents, text, etc. Additionally, a content item can include a folder or other mechanism of grouping content items together with different behaviors, such as collections of content items, playlists, albums, etc. Certain types of content items are configured to be streamed, such as audio and video files. Streaming generally allows the receiving device, such as client device 102, to output ("playback") the content item before the entire contents of the item are received.

Additionally, through client device 102 users can request to access content items stored by content management system 104. A user can request to access a content item using, for example, a user interface provided by content management system 104 or a link (e.g., a uniform resource locator) generated by system 104 for accessing the item. When client device 102 sends a request to content management system 104 to access a content item, client device 102 loads a media player. The media player presents the requested content item as it is streamed by content management system 104 to client device 102.

Content management system 104 is a computer system that allows users to provide content items for storage and allows users to access stored content items. Therefore, from client device 102 a user may, for example, upload a content item to system 104 for storage and at a later time the content item may be accessed from the same or a different client device 102 operated by the same or a different user.

Each user that registers with content management system 104 has an account with system 104. A registered user can upload content items to system 104 for association with his account. The user can organize the items associated with his account into different folders. Further, the user can allow/give permission to other users to access content items associated with his account. To allow other users to access a content item, the user can share with the other users a share link that provides direct access to the content item. The user can also share with other users a folder that includes multiple content items uploaded by the user to his account. The users with whom the folder was shared can access the content items included in the folder. Additionally, the users can upload content items to include in the shared folder.

When a user requests to upload a content item for storage and association with an account, content management system 104 receives the content item from the user's client device 102. Content management system 104 stores the item in an original format. In one embodiment, the original format is a non-streaming format. In one embodiment, the original format is the format in which client device 102 uploaded the item to the system 104. Content management system 104 also determines whether to transcode a portion of the received content item from the original format to a streaming format prior to making the item accessible for access. Content management system 104 may determine, for example, to transcode a portion of the item if the item has a total length that is greater than a threshold (e.g., greater than 30 seconds).

A streaming format is a format that is appropriate for streaming the item to client device 102 that requests the content item. A streaming format may be, for example, .3gp, .3gpp, .3gpp2, .asf, .avi, .aac, .dv, .flv, .m2t, .m4v, .mkv, .mov, .mp4, .mpg, .mpeg, .mts, .oggtheora, .ogv, .rm, .ts, .vob, .webm, .wmv, and H0.264.

If content management system 104 determines to transcode a portion of the content item, content management system 104 selects the portion of the item to transcode (e.g., the first 30 seconds). System 104 transcodes the selected portion from the original format to the streaming format. Content management system 104 stores the transcoded portion. In one embodiment, the transcoded portion is less than the total length of the content item. For example, if the content item is a video that has a total playback time of three minutes, content management system 104 may only transcode the first 45 seconds. The process of transcoding prior to making a content item available for access is referred to as pre-transcoding herein. Additionally, as described herein, the length of a portion or content item may refer, for example, to its duration, playback time, or size (e.g., number of bytes).

When client device 102 requests the stored content item from content management system 104, content management system 104 first sends by streaming to client device 102 the portion of the item that has been pre-transcoded. As content management system 104 streams the pre-transcoded portion, system 104 also transcodes from the original format to the streaming format the remainder of the content item that was not pre-transcoded. After sending the pre-transcoded portion, system 104 streams the remainder of the content item in the streaming format.

Pre-transcoding a portion of the content item rather than the entire content item conserves storage space for content management system 104. Additionally, pre-transcoding prior to making the item available rather than after client device 102 requests the item, allows content management system 104 to quickly start streaming the item to device 102.

As illustrated in FIG. 1, content management system 104 includes metadata server 108, block server 110, controller server 112, transcoding servers 114, cache 116, and storage layer 118. Those of skill in the art will recognize that other embodiments of content management system 104 can have different and/or other components than the ones described here, and that the functionalities can be distributed among the components in a different manner. While components of content management system 104 are described as separate computer servers, in other embodiments each of these servers may be implemented as a module of a single server.

Metadata server 108 processes requests received from client devices 102 regarding content items and is one means for performing this function. In one embodiment, upon request from a user having an account with system 104, metadata server 108 provides a user interface to client device 102 that allows the user to see different content items associated with the user's account. In one embodiment, prior to providing the user interface, metadata server 108 requires that the user provide authentication information (e.g., a login and password) associated with the account.

Through the user interface, the user can request to upload new content items for storage and can request to access stored items associated with the user's account. When the user requests to upload a content item for storage, metadata server 108 receives from user's client device 102 the content item and metadata associated with the item. In one embodiment, the content item is received in an original format. In one embodiment, the metadata associated with the item includes one or more of the following: the name of the content item, an indication as to one or more accounts with which the item should be associated, a folder in which the item is to be included, and an indication as to the user that requested the upload.

Metadata server 108 forwards the content item and the metadata to block server 110 for storage in storage layer 118. Storage layer 118 stores content items in the original format. Metadata server 108 additionally determines whether to pre-transcode a portion of the content item from the original format to a streaming format. In one embodiment, metadata server 108 is set to pre-transcoding a portion of every content item that is uploaded.

In another embodiment, metadata server 108 determines whether to pre-transcode based on one or more of the following factors: a type of the item (e.g., video, audio, etc), the total length of the item (e.g., only items longer than a threshold length), internal codec format, size of the item (e.g., only items greater than a threshold size), characteristics of the uploading user (e.g., a type of account the uploading user has or the amount of usage of system 104 by the user), and whether the item includes media that is streamed to requesting client device 102. As an example, metadata server 108 determines to pre-transcode a portion of the content item if the uploading user has an upper-tier account for which a subscription fee is paid and the item includes video content. As another example, metadata server 108 determines to pre-transcode if the file size of item is greater than a threshold size.

Based on the determination as to whether to pre-transcode a portion of the content item, metadata server 108 updates an item table. The item table includes an identifier for each content item that has been uploaded to system 104 for storage, an indication as to whether the content item has been pre-transcoded, and which portion has been pre-transcoded if applicable. If a determination is made not to pre-transcode the uploaded content item, metadata server 108 updates the item table to indicate that the item has not been pre-transcoded.

On the other hand, if metadata server 108 determines to pre-transcode a portion of the item, metadata server 108 determines which portion of the item to pre-transcode. In one embodiment, the determined portion is less than the total length of the content item (i.e., the determined portion does not include the entire content item). In another embodiment, the determined portion may include the entire content item.

In one embodiment, metadata server 108 determines to pre-transcode a fixed portion of the content item set by a system administrator. For example, for each content item that is to be pre-transcoded, metadata server 108 determines to pre-transcode the first 30 seconds. As another example, metadata server 108 determines to pre-transcode 30% of each content item that is to be transcoded.

In another embodiment, metadata server 108 determines the portion of the content item to pre-transcode based on a determined sample time. The sample time is determined by metadata server 108 based on one or more of the following factors: an estimated amount of time it would take to transcode a sample segment of the item of a specific size, an estimated sending time of the segment from system 104 to client device 102, and an estimated amount of time it would take an average client device 102 to start playback of the segment once it is received by device 102. In one embodiment, the portion of the content item that is pre-transcoded is equal to the sample time multiplied by a factor. For example, if the sample time is one second and the factor is 10, metadata server 108 determines to transcode the first 10 seconds of the content item.

Metadata server 108 sends a request to controller server 112 to select a transcoding server 114 and to have it pre-transcode the determined portion of the content item from the original format to the streaming format and to store it in cache 116. The cache 116 stores pre-transcoded portions of content items. Metadata server 108 receives a notification from selected transcoding server 114 once the determined portion has been pre-transcoded and stored in cache 116. When metadata server 108 receives the notification, metadata server 108 updates the item list to indicate that the content item has been pre-transcoded and which portion was pre-transcoded.

In another embodiment, instead of metadata server 108 making the determination as to whether to pre-transcode a portion of the item when the item is uploaded, metadata server 108 waits to make the determination until one or more triggers are detected. The triggers may include, for example, the user requesting a share link to share the content item with other users, the content item being included in a shared folder, or a folder in which the content item is included being shared with other users. In another embodiment, metadata server 108 determines whether to pre-transcode a portion of the item when the item is uploaded. However, if a determination is made to pre-transcode, metadata server 108 waits for one or more of the triggers before sending the pre-transcoding request to controller server 112.

As described above, through the user interface provided by metadata server 108 or through a link, a user can request to access a content item stored by content management system 104. When a user requests a content item, metadata server 108 analyzes its item table to determine whether a portion of the content item was pre-transcoded. If a portion of the content item was not pre-transcoded, metadata server 108 sends a request to controller server 112 to select a transcoding server 114 to transcode the entire content item stored in storage layer 118 from its original format to the streaming format. If a portion of the content item was pre-transcoded, metadata server 108 determines which portion was pre-transcoded. If the portion that was pre-transcoded has a length that is less than the total length of the item, metadata server 108 sends a request to controller server 112 to select a transcoding server 114 to transcode to the streaming format the remainder of the item that was not pre-transcoded. If the portion that was pre-transcoded is the entire content item, there is no need for metadata server 108 to request transcoding of the item from controller server 112.

Metadata server 108 generates a token that includes an identifier of the content item and a value indicating the portion/length of the content item that was pre-transcoded. In one embodiment, if the item was not pre-transcoded, the value is equal to zero in order to indicate that no portion of the item has been pre-transcoded. If metadata server 108 requested that controller server 112 select a transcoding server 114 to transcode the entire item or a remaining non-transcoded portion, metadata server 108 also includes in the token an identifier associated with transcoding server 114 selected by controller server 112. The identifier of selected transcoding server 114 is received by metadata server 108 from controller server 112.

Metadata server 108 sends the generated token to client device 102 used by the user to request the content item. As described in more detail below, the token is used by client device 102 to request the content item from block server 110.

Block server 110 stores uploaded content items and sends segments of requested content items to client devices 102, and is one means for performing this function. When a content item is uploaded by a client device 102 for storage, block server 110 stores the content item in storage layer 118 along with the metadata provided with the item. Block server 110 stores the content item in storage 118 in the original format.

As described above, when a user requests a stored content item, metadata server 108 provides a token to user's client device 102 that includes an identifier of the content item, a value indicating a portion of the content item that was pre-transcoded, and if applicable an identifier of a transcoding server 114 selected for transcoding. A media player loaded on client device 102 requests the content item from block server 110. In the request the media player includes the token provided by metadata server 108. Based on the token, block server 110 determines whether a portion of the content item has been pre-transcoded to the streaming format. If a portion has been pre-transcoded, block server 110 retrieves the pre-transcoded portion from cache 116 (e.g., requests from cache 116 a number of bytes that are pre-transcoded, according to the encoded value) and sends the pre-transcoded portion to the media player for presentation.

If the token includes an identifier of a transcoding server 114 selected to transcode the entire item or a remaining portion of the item, as selected transcoding server 114 transcodes segments of the content item, block server 110 obtains the segments from transcoding server 114 and provides them to the media player. Through this process all segments/portions of content item are streamed to the media player.

Controller server 112 is a load balancing server that selects transcoding servers 114 for processing transcoding requests and is one means for performing this function. When controller server 112 receives a request to transcode a portion of a content item from an original format to a streaming format, controller server 112 uses a load-balancing algorithm to select a transcoding server 114 from the multiple available transcoding servers 114. Transcoding server 114 is selected in a way that prevents any one transcoding server 114 from becoming overloaded with transcoding requests. Controller server 112 forwards to selected transcoding server 114 the request received from metadata server 108.

Transcoding servers 114 are a group of load balanced computer servers that transcode content items according to requests issued by metadata server 108 and is one means for performing this function. Transcoding servers 114 transcode from an original format of content items to a streaming format.

Figure 2A:
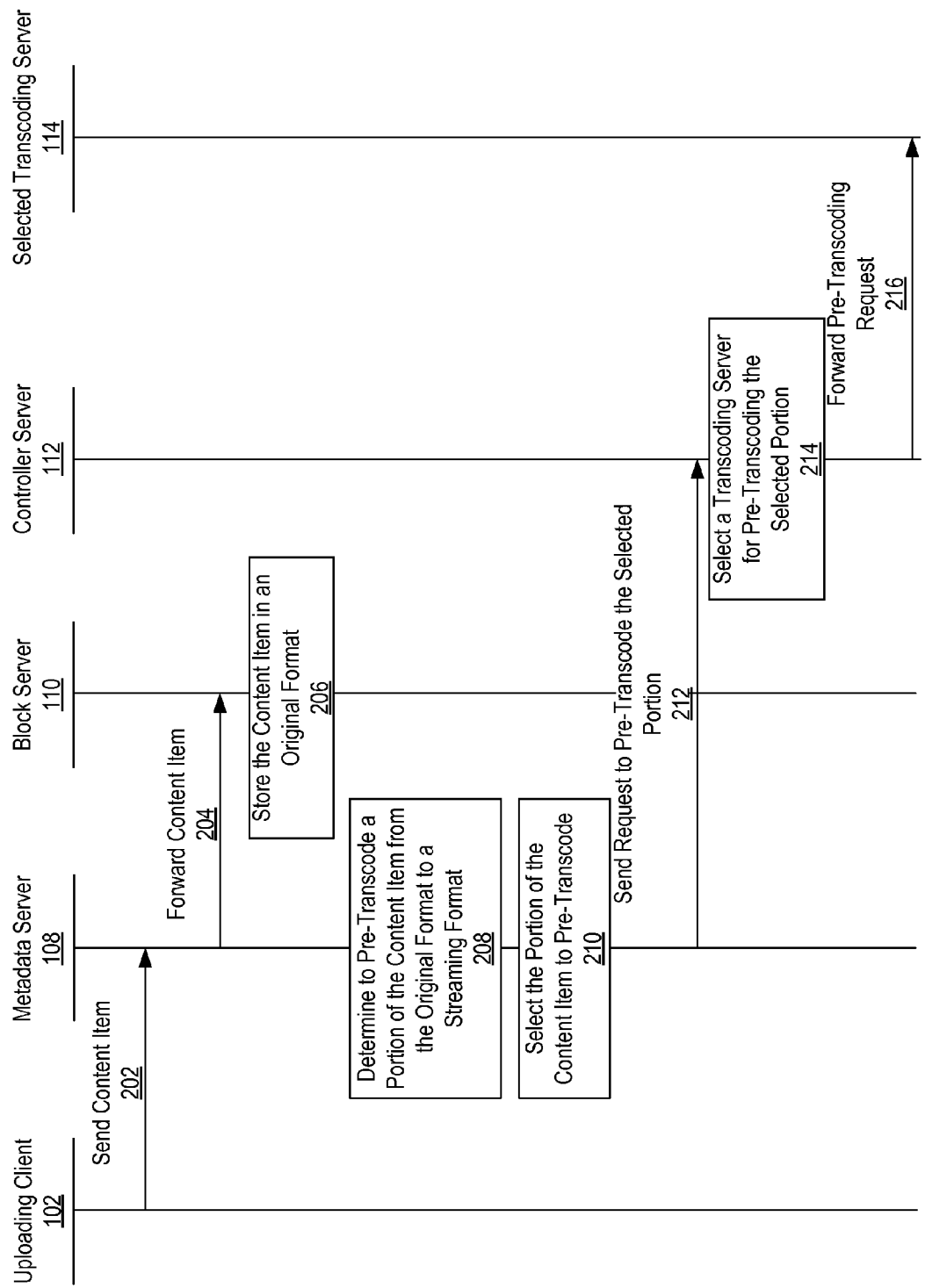

FIGS. 2A and 2B illustrate an interaction diagram of a process for pre-transcoding a portion of an uploaded content item according to one embodiment. The interaction diagram illustrates the steps performed by a client device 102 (may also be referred to as the "uploading client") and metadata server 108, block server 110, controller server 112 and a transcoding server 114 of content management system 104.

Starting with FIG. 2A, uploading client 102 sends 202 to metadata server 108 a content item for storage by content management system 104. Content item is received by metadata server 108 in an original format. Metadata server 108 forwards 204 the content item to block server 110. Block server 110 stores 206 the content item in storage layer 118 in the original format. Metadata server 108 determines 208 to pre-transcode a portion of the content item from the original format to a streaming format. Based on the determination, metadata server 108 selects 210 the portion of the content item to pre-transcode.

Metadata server 108 sends 212 a request to controller server 112 for the selected content item portion to be transcoded. Controller server 112 selects 214 a transcoding server 114 to pre-transcode the selected content item portion. Controller server 112 forwards 216 the pre-transcoding request to selected transcoding server 114.

Continuing with FIG. 2B, selected transcoding server 114 transcodes 218 the selected content item portion from the original format to the streaming format. Transcoding server 114 stores 220 the transcoded portion in cache 116. Transcoding server 114 additionally sends 222 a notification to the metadata server 108 indicating that the selected portion has been pre-transcoded. Metadata server 108 updates 224 the item table to indicate that the content item has been pre-transcoded and which portion has been pre-transcoded.

Figure 3B:
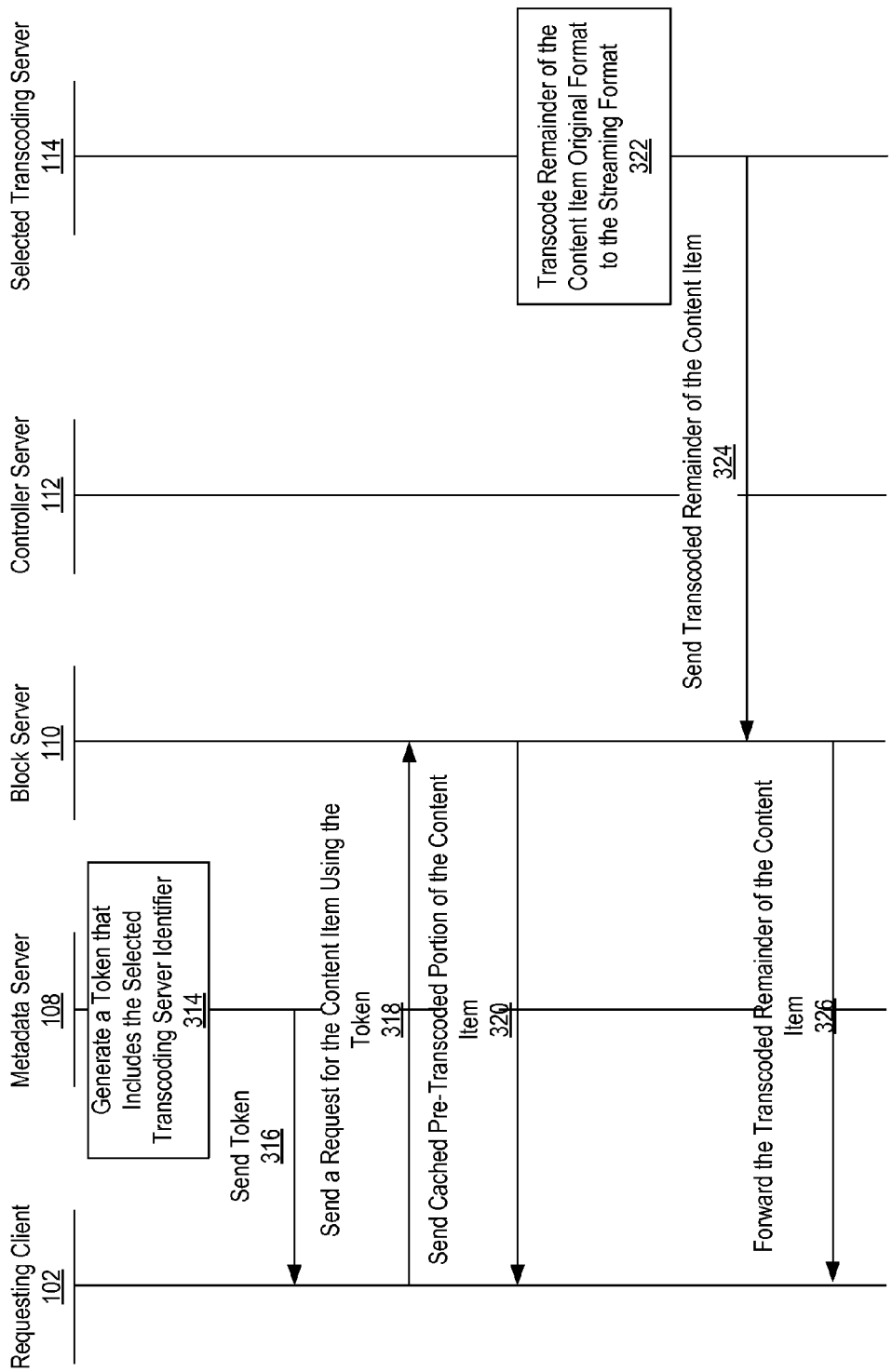

FIGS. 3A and 3B illustrate an interaction diagram of a process for streaming a stored content item to a client device 102 where a portion of the content item has been pre-transcoded. The interaction diagram illustrates the steps performed by client device 102 (may also be referred to as the "requesting client") and metadata server 108, block server 110, controller server 112 and a transcoding server 114 of content management system 104.

Starting with FIG. 3A, requesting client 102 sends 302 a request for the content item to metadata server 108. Requesting client 102 may be the same client device that uploaded the item for storage or a different client device operated by the same user that requested to upload the item or by a different user having permission to access the item. Metadata server 108 determines 304 based on the item table that a portion of the requested content item has been pre-transcoded. The portion that has been pre-transcoded has a length that is less than a total length of the content item.

Metadata server 108 sends 306 a request to controller server 112 to transcode the remainder of the content item that was not pre-transcoded (i.e., transcode the remaining non-transcoded portion of the item). Controller server 112 selects 308 a transcoding server 114 to transcode the remainder of the content item. Controller server 112 forwards 310 the transcoding request to selected transcoding server 114. Controller server 112 additionally sends 312 an identifier associated with selected transcoding server 114 to metadata server 108.

Continuing with FIG. 3B, metadata server 108 generates 314 a token to send to requesting client 102. In the token metadata server 108 includes an identifier of the content item, a value indicating the portion of the content item that has been pre-transcoded, and the identifier of transcoding server 114 selected to transcode the remainder of the item. Metadata server 108 sends 316 the generated token to requesting client 102.

Requesting client 102 sends 318 to block server 110 a request for the content item using the token. In one embodiment, the request includes the token. Based on the request, block server 110 first sends 320 to requesting client 102 the pre-transcoded portion of the content item stored in cache 116. During the sending of the pre-transcoded portion, selected transcoding server 114 transcodes 322 the remainder of the content item stored in storage layer 118 that was not pre-transcoded. Transcoding server 114 transcodes the remaining non-transcoded portion from the original format to the streaming format. Transcoding server 114 sends 324 the transcoded remaining portion of the content item to block server 110 which forwards 326 it to the requesting client 102. In one embodiment, as transcoding server 114 transcodes segments of the remaining portion, transcoding server 114 provides the segments to block server 110 for immediate sending to requesting client 102.

Figure 4:
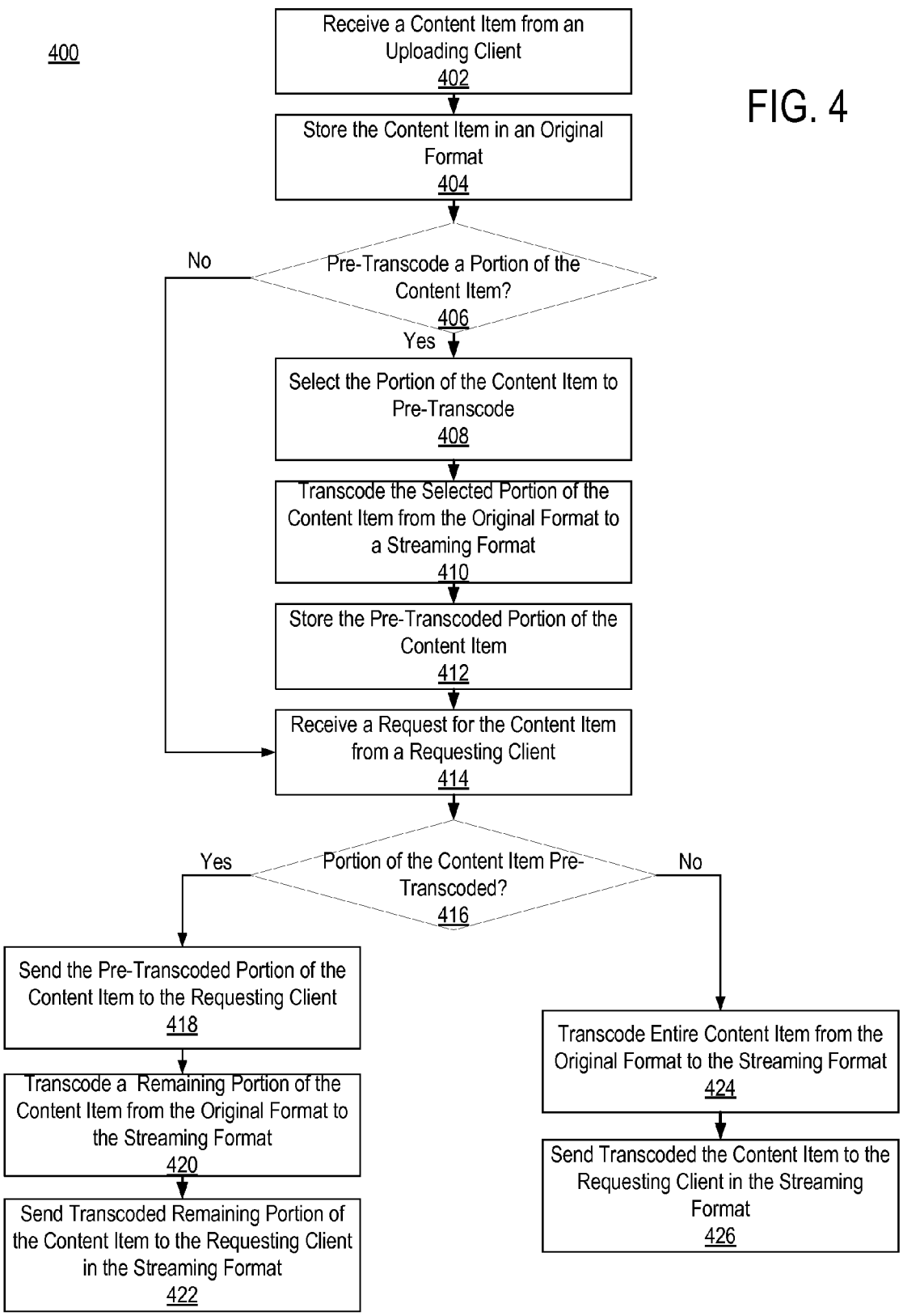
FIG. 4 is a flow chart illustrating the operations of the content management system in storing an uploaded content item and providing the content item to a requesting client device according to one embodiment.

FIG. 4 is a flow chart 400 illustrating the operations of content management system 104 in storing an uploaded content item and providing the content item to requesting client device 102. Content management system 104 receives 402 the content item from uploading client 102. System 104 stores 404 the content item in an original format.

System 104 determines 406 whether to pre-transcode a portion of the content item. If a determination is made not to pre-transcode a portion of the content item, the process skips to step 414. On the other hand, if system 104 determines to pre-transcode, system 104 selects 408 the portion of the content item to pre-transcode. System 104 transcodes 410 the selected portion of the content item from the original format to a streaming format. System 104 stores 412 the pre-transcoded portion of the content item.

When system 104 receives 414 a request for the stored content item from a requesting client 102, determines 416 whether a portion of the content item has been pre-transcoded. If a portion of the content item has been pre-transcoded, system 104 sends 418 the pre-transcoded portion of the content item to requesting client 102. During the sending, system 104 additionally transcodes 420 a remaining portion of the content item that was not pre-transcoded. The remaining portion is transcoded from the original format to the streaming format. System 104 sends 422 to requesting client 102 the transcoded remaining portion in the streaming format.

On the other hand, if a determination is made that a portion of the content item has not been pre-transcoded, system 104 transcodes 424 the entire content item from the original format to the streaming format. System 104 sends 426 the transcoded content item in the streaming format to requesting client 102.

Those of skill in the art will recognize that other embodiments can perform the steps described above for FIGS. 2A, 2B, 3A, 3B, and 4 in different order. Moreover, other embodiments can include different and/or additional steps that the ones described.

Additional Considerations

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
   selecting, by a content management system, a first portion of a content item to transcode from a first format to a second format based on an estimated amount of time required to transcode a sample segment of the content item from the first format to the second format, wherein the first format is a non-streaming format and the second format is a streaming format;
   transcoding the selected first portion of the content item from the first format to the second format;
   storing the transcoded first portion of the content item in the second format;
   storing a second portion of the content item in the first format; and
   making the content item available by the content management system for access by one or more client devices.

2. A computer-implemented method, comprising:
   selecting, by a content management system, a first portion of a content item to transcode from a first format to a second format based on an estimated sending time of a sample segment of the content item in the second format from the content management system to a client device, wherein the first format is a non-streaming format and the second format is a streaming format;
   transcoding the selected first portion of the content item from the first format to the second format;
   storing the transcoded first portion of the content item in the second format;
   storing a second portion of the content item in the first format; and
   making the content item available by the content management system for access by one or more client devices.

3. The method of claim 2, further comprising:
   responsive to a user requesting from a receiving client device that the content item be presented:
      sending the transcoded first portion of the content item in the second format to the receiving client device;
      while sending the transcoded first portion, transcoding the stored second portion of the content item from the first format to the second format; and
      sending the transcoded second portion of the content item in the second format to the receiving client device.

4. A computer-implemented method, comprising:
   selecting, by a content management system, a first portion of a content item to transcode from a first format to a second format based on an estimated time required to start playback of a sample segment of the content item in the second format by a client device, wherein the first format is a non-streaming format and the second format is a streaming format;
   transcoding the selected first portion of the content item from the first format to the second format;
   storing the transcoded first portion of the content item in the second format;

storing a second portion of the content item in the first format; and making the content item available by the content management system for access by one or more client devices.

5. A computer-implemented method, comprising:

identifying a content item including a first portion and a second portion, wherein the first portion and the second portion are in a first format that is a non-streaming format;

pre-transcoding, by a content management system, the first portion of the content item without pre-transcoding the second portion of the content item, the first portion pre-transcoded from the first format to a second format that is a streaming format;

storing the pre-transcoded first portion of the content item in the second format;

storing the second portion of the content item in the first format; and responsive to a user requesting from a receiving client device that the content item be presented:

sending the pre-transcoded first portion of the content item in the second format to the receiving client device;

while sending the pre-transcoded first portion to the receiving client device, transcoding the stored second portion of the content item from the first format to the second format; and sending the transcoded second portion of the content item in the second format to the receiving client device.

6. The method of claim 5, wherein a length of the first portion is less than a total length of the content item.

7. The method of claim 5, wherein the first portion is pre-transcoded responsive to the content item being configured for streaming.

8. The method of claim 5, wherein the first portion is pre-transcoded responsive to a total length of the content item being greater than a threshold length.

9. The method of claim 5, wherein the first portion is pre-transcoded responsive to a size of the content item being greater than a threshold size.

10. The method of claim 5, further comprising:

receiving, by the content management system, the content item in the first format from an uploading client device.

11. The method of claim 5, wherein the first portion is pre-transcoded responsive to the user requesting a share link to share the content item with one or more additional users, the share link providing access to the content item using the content management system.

12. The method of claim 5, wherein the first portion is pre-transcoded responsive to the user sharing the content item with one or more additional users.

13. A non-transitory computer-readable storage medium having executable computer program instructions for performing operations comprising:

identifying a content item including a first portion and a second portion, wherein the first portion and the second portion are in a first format that is a non-streaming format;

pre-transcoding, by a content management system, the first portion of the content item without pre-transcoding the second portion of the content item, the first portion pre-transcoded from the first format to a second format that is a streaming format;

storing the pre-transcoded first portion of the content item in the second format;

storing the second portion of the content item in the first format; and responsive to a user requesting from a receiving client device that the content item be presented:

sending the pre-transcoded first portion of the content item in the second format to the receiving client device;

while sending the pre-transcoded first portion to the receiving client device, transcoding the stored second portion of the content item from the first format to the second format; and sending the transcoded second portion of the content item in the second format to the receiving client device.

14. The computer-readable storage medium of claim 13, wherein a length of the first portion is less than a total length of the content item.

15. The computer-readable storage medium of claim 13, wherein the first portion is pre-transcoded responsive to the content item being configured for streaming.

16. The computer-readable storage medium of claim 13, wherein the first portion is pre-transcoded responsive to a total length of the content item being greater than a threshold length.

17. The computer-readable storage medium of claim 13, wherein the first portion of the content item is selected for pre-transcoding based on an estimated amount of time to transcode a sample segment of the content item from the first format to the second format.

18. The computer-readable storage medium of claim 13, wherein the first portion of the content item is selected for pre-transcoding based on an estimated sending time of a sample segment of the content item in the second format from the content management system to a client device.

* * * * *